(12) United States Patent
Ohno et al.

(10) Patent No.: US 6,447,700 B1
(45) Date of Patent: Sep. 10, 2002

(54) RESIN COMPOSITION FOR OPTICAL FIBER LOOSE TUBES, OPTICAL FIBER LOOSE TUBE AND PRODUCTION PROCESS THEREOF

(75) Inventors: Masamori Ohno, Chiba (JP); Kiyoshi Sugie, Chiba (JP); Shinichi Sasaki, Hitachi (JP); Hiroyasu Oki, Hitachi (JP)

(73) Assignees: Teijin Limited, Osaka (JP); Hitachi Cable, Ltd., Tokyo (JP)

( * ) Notice: Subject to any disclaimer, the term of this patent is extended or adjusted under 35 U.S.C. 154(b) by 118 days.

(21) Appl. No.: 09/599,768

(22) Filed: Jun. 23, 2000

(30) Foreign Application Priority Data

Jun. 24, 1999 (JP) ............................................ 11-178680

(51) Int. Cl.[7] .............................................. B29D 11/00
(52) U.S. Cl. ........................................ 264/1.29; 264/1.6
(58) Field of Search ................................. 264/1.1, 1.24, 264/1.28, 1.29, 1.6

(56) References Cited

U.S. PATENT DOCUMENTS 4,713,408 A * 12/1987 Takahashi et al.
5,039,727 A * 8/1991 Onishi et al.

FOREIGN PATENT DOCUMENTS

| EP | 0 185 555 | 6/1986 |
|---|---|---|
| EP | 0 362 8872 | 4/1990 |
| JP | 8-227030 | 9/1996 |

OTHER PUBLICATIONS

English language abstract JP 8227030 A Sep. 3, 1996.
A. Conix, On the Molecular Weight Determination of Poly(ethylene terephthalate) (Makromol. Chem. 26, 226 (1958)).
Patent Abstracts of Japan Abstract of JP 06–128464 (May 10, 1994).
Patent Abstracts of Japan Abstract of JP 58–059256 (Apr. 8, 1983).
Patent Abstracts of Japan Abstract of JP 2000–111768 (Apr. 21, 2000).
Patent Abstracts of Japan Abstract of JP 08–146261 (Jun. 7, 1996).
Patent Abstracts of Japan Abstract of JP 09–316182 (Dec. 09, 1997).

* cited by examiner

*Primary Examiner*—Mathieu D. Vargot
(74) *Attorney, Agent, or Firm*—Sughrue Mion, PLLC

(57) ABSTRACT

A resin composition for optical fiber loose tubes contains (A) 100 parts by weight of polybutylene terephthalate having a terminal carboxyl group concentration of 10 eq/ton or less and an intrinsic viscosity of 1.0 to 1.2. and (B) 0.005 to 0.1 part by weight of polyethylene wax. The optical fiber loose tube is produced by extrusion molding at a haul-off speed of 200 m/min or more a resin composition for optical fiber loose tubes. The resin composition containing (A) 100 parts by weight of polybutylene terephthalate having a terminal carboxyl group concentration of 10 eq/ton or less and an intrinsic viscosity of 1.0 to 1.2, and (B) 0.005 to 0.1 part by weight of polyethylene wax.

4 Claims, No Drawings

RESIN COMPOSITION FOR OPTICAL FIBER LOOSE TUBES, OPTICAL FIBER LOOSE TUBE AND PRODUCTION PROCESS THEREOF

DETAILED DESCRIPTION OF THE INVENTION

The present invention relates to a resin composition for optical fiber loose tubes which has excellent hydrolysis resistance and extrusion moldability and enables an optical fiber loose tube to be extrusion molded at a high haul-off speed, an optical fiber loose tube obtained by extrusion molding the resin composition, and a production process thereof.

An optical fiber loose tube contains loosely an optical fiber in tube to be used as a structure having a gel-like intimate mixture filled In a space therein. A plurality of the optical fiber loose tubes are bundled into an optical fiber cable. Heretofore, polybutylene terephthalate and compositions thereof have been widely used in the optical fiber loose tube thanks to their excellent mechanical strength and chemical resistance.

JP-A 8-227030 (the term "JP-A" as used herein means an "unexamined published Japanese patent application") discloses a resin composition which comprises 100 parts by weight of polybutylene terephthalate having an intrinsic viscosity of 1.0 or more and a terminal carboxyl group concentration of 45 eq/ton or less, 0.01 to 1.0 part by weight of a phosphorus-based compound and 0.01 to 2. 0 parts by weight of a hindered phenol compound or thioether compound.

Polybutylene terephthalate and compositions thereof for use in optical fiber loose tubes must overcome problems with heat resistance and hydrolysis.

Optical fiber loose tubes must be produced stably with uniform quality and there is seen a tendency toward an increase in haul-off speed for extrusion molding to improve productivity.

Although there is no problem when conventional resin compositions are extrusion molded at a haul-off speed of 150 m/min or less, when the haul-off speed is increased to 200 m/min or more to improve productivity, so-called scum which is a resin or the like adhering to a dice is separated from the dice and adheres to the inner side of the loose tube. As a result, the quality of the tube is impaired, yield is lowered, and productivity cannot be improved.

It is an object of the present invention to provide a resin composition for optical fiber loose tubes which has excellent hydrolysis resistance and extrusion moldability, is free from a defect caused by scum even at a high haul-off speed, particularly a haul-off speed of 200 m/min or more, and enables an optical fiber loose tube to be extrusion molded at a high yield.

It is another object of the present invention to provide an optical fiber loose tube which can be produced from the above resin composition of the present invention.

It is still another object of the present invention to provide a process for producing the optical fiber loose tube of the present invention from the resin composition of the present invention.

Other objects and advantages of the present invention will become apparent from the following description.

The inventors of the present invention have conducted intensive studies to solve the above problem and have found that a loose tube can be produced at a high yield at a high haul-off speed by adding polyethylene wax to a resin composition while a defect caused by the formation of scum is suppressed.

That is, according to the present invention, firstly, the above objects and advantages of the present invention are attained by a resin composition for optical fiber loose tubes which comprises (A) 100 parts by weight of polybutylene terephthalate having a terminal carboxyl group concentration of 10 eq/ton or less and an intrinsic viscosity of 1.0 to 1.2. and (B) 0.005 to 0.1 part by weight of polyethylene wax.

According to the present invention, secondly, the above objects and advantages of the present invention are attained by an optical fiber loose tube which comprises (A') 100 parts by weight of polybutylene terephthalate having a terminal carboxyl group concentration of 15 eq/ton or less and an intrinsic viscosity of 1.0 to 1.2 and (B) 0.005 to 0.1 part by weight of polyethylene wax.

Further, according to the present invention, thirdly, the above objects and advantages of the present invention are attained by a process for producing the above optical fiber loose tube of the present invention which process comprises the step of extrusion molding the above resin composition of the present invention at a haul-off speed of 200 m/min or more. According to the production process of the present invention, the optical fiber loose tube of the present invention can be produced at a high yield without a defect caused by the formation of scum.

The present invention will be described in detail hereinafter.

Polybutylene Terephthalate (A)

The polybutylene terephthalate (A) is a polyester comprising terephthalic acid as the main dicarboxylic acid component and 1,4-butanediol as the main glycol component.

The expression "main" as used herein means that the component is contained in an amount of 80 mol % or more, preferably 90 mol % or more based on the total of all the dicarboxylic acid components or all the glycol components.

The polybutylene terephthalate (A) encompasses not only a homopolymer but also a copolymer comprising a comonomer. When the comonomer is copolymerized, the proportion of the comonomer is 20 mol % or less, preferably 10 mol % or less based on the total of all the dicarboxylic acid components or all the glycol components.

The copolymerizable acid component is an aromatic dicarboxylic acid other than terephthalic acid, such as isophthalic acid, naphthalenedicarboxylic acid, diphenyldicarboxylic acid, diphenyl ether dicarboxylic acid, diphenoxyethane dicarboxylic acid, diphenyl ketone dicarboxylic acid or diphenylsulfone dicarboxylic acid; aliphatic dicarboxylic acid such as succinic acid, adipic acid or sebacic acid: or alicyclic dicarboxylic acid such as cyclohexanedicarboxylic acid, tetralindicarboxylic acid or decalindicarboxylic acid.

The copolymerizable glycol component other than 1,4-butanediol is ethylene glycol, hexamethylene glycol, neopentyl glycol, cyclohexane dimethanol, tricyclodecane dimethylol, xylylene glycol, bisphenol A, bisphenol B, bishydroxyethoxy bisphenol A or the like.

A polyfunctional compound having a functionality of 3 or more, such as glycerin, trimethylol propane, pentaerythritol, trimellitic acid, trimesic acid or pyromellitic acid may be copolymerized in limits that the polyester does not lose its moldability substantially.

The terminal carboxyl group concentration of polybutylene terephthalate (A) constituting the resin composition of the present invention is 10 eq/ton or less.

When the terminal carboxyl group concentration is higher than 10 eq/ton, a loose tube which can retain tensile elongation under a high-temperature and high-humidity environment for a long time cannot be obtained and a loose tube which is easily cracked or broken by external force when it is used under the above conditions is provided, thereby impairing the function of protecting an optical fiber. The terminal carboxyl (COOH) group concentration is the number of equivalents (eq) per $10^6$ g (ton) of a polymer measured by an A. Conix method (Makromol. Chem. 26,226 (1958)).

The intrinsic viscosity of polybutylene terephthalate (A) is 1.0 to 1.2. preferably 1.1 to 1.2. When the intrinsic viscosity is lower than 1.0, the resulting composition deteriorates in moldability for the extrusion molding of a tube and does not have satisfactory shapability. Further when external force is applied, the obtained loose tube is easily cracked or broken, thereby impairing the function of protecting an optical fiber. When the intrinsic viscosity is higher than 1.2. the extrusion moldability of an optical fiber loose tube deteriorates and the production cost of polybutylene terephthalate boosts. The intrinsic viscosity is a value calculated from solution viscosity measured at 25° C. in orthochlorophenol.

As means of obtaining the above polybutylene terephthalate (A) is preferably solid-phase polymerization. more preferably the solid-phase polymerization of polybutylene terephthalate containing an alkaline metal compound. This makes it possible to produce polybutylene terephthalate having a low terminal carboxyl group concentration and an intrinsic viscosity of 1.0 to 1.2 at a low production cost.

The alkaline metal compound is the hydroxide, inorganic acid salt or organic acid salt such as acetate, carbonate or hydrate thereof, complex salt or ammonium salt of an alkali metal or alkali earth metal. They may be used alone or in combination.

Illustrative examples of the alkaline metal compound include lithium hydroxide, sodium hydroxide, potassium hydroxide, rubidium hydroxide, cesium hydroxide, francium hydroxide, beryllium hydroxide, magnesium hydroxide, strontium hydroxide, barium hydroxide, lithium acetate, sodium acetate, potassium acetate, magnesium acetate, calcium acetate, lithium carbonate, sodium carbonate, potassium carbonate, lithium benzoate, sodium benzoate, potassium benzoate and the like. Out of these, sodium compounds and potassium compounds are preferred.

Polyethylene Wax (B)

A polyethylene homopolymer is preferred as the polyethylene wax (B) and commercially available products under the name of polyethylene wax may be used. The polyethylene wax is an ethylene lower polymer having a number average molecular weight of 500 to 20,000 and can be produced by polymerizing ethylene. decomposing high molecular weight polyethylene, or separating a lower polymer by-produced during the production of high molecular weight polyethylene.

Polyethylene wax products commercially available on the market include products produced by a polymerization method such as Mitsui HI-WAX (of Mitsui Chemicals, Inc.), Dialene 30 (of Mitsubishi Chemical Corporation), Diacarna 30 (of Mitsubishi Chemical Corporation) and Nisseki Rexpole (of Nippon Mitsubishi Oil Corparation); products produced by a decomposition method such as Sun Wax (of Sanyo Chemical Industries, Ltd.); and products produced by a by-production method such as Polyrets (of Chusei Wax Polymer Co., Ltd.) and Neo Wax (of Yasuhara Chemical Co., Ltd.). Further, AC Polyethylene (of Allied Chemical Co., Ltd.), Eporene (of Eastman Kodak Co., Ltd.), Hoechst Wax (of Hoechst AG), A-Wax (of BASF Co., Ltd.), Polywax (of Petrolite Co., Ltd.) and Escomer (of EXXON Chemical Co., Ltd.) are available and may be used as polyethylene wax in the present invention.

Out of these, what have a number average molecular weight of 500 to 20,000, specifically 1,000 to 10,000, more specifically 1,000 to 8,000 are preferred. When the molecular weight is lower than 500, the effect of suppressing scum is impaired and when the molecular weight is higher than 20,000, dispersibility lowers, thereby impairing the characteristic properties of an optical fiber loose tube disadvantageously.

The amount of the polyethylene wax (B) added is 0.005 to 0.1 part by weight based on 100 parts by weight of polybutylene terephthalate (A). When the amount is smaller than 0.005 part by weight, the effect of suppressing scum becomes unsatisfactory and when the amount is larger than 0.1 part by weight, the effect of suppressing scum does not increase but costs boost.

Additives

The resin composition of the present invention may contain a crystal nucleating agent which is generally used in a polyester, such as a carboxylic acid metal salt, talc, kaolin, titanium oxide or silica gel.

The resin composition of the present invention may contain a hindered phenol compound, phosphorus-based compound or thioether-based compound to prevent oxidative deterioration under high-temperature high-humidity conditions.

Examples of the hindered phenol compound include 2.6-di-t-butyl-p-cresol, 2,2'-methylene-bis-(4-methyl-6-di-t-butylphenol), 4,4'-thiobis(3-methyl-t-butylphenol), 1,1,3-tris(2-methyl-4-hydroxy-5-t-butylphenyl)butane. pentaerythrityl-tetrakis[3-(3.5-di-t-butyl-4- hydroxyphenyl) proplonate and n-octadecyl-3-(3',5'-di-t-butyl-4'-hydroxyphenyl)propionate.

Examples of the phosphorus-based compound include phosphite-based organic compounds, phosphonite-based organic compounds, phosphoric acid esters, phosphorous acid esters, and metal salts of phosphoric acid and phosphorous acid.

Examples of the thioether compound include di-tridecyl-thio-dipropionate, tetrakis[methylene-3-(dodecylthio) propionate], and bis[2-methyl-4-{3-n-alkyl (C12 or C14) thiopropionyloxy}-5-t-butylphenyl]sulfide.

The resin composition of the present invention may further contain a pigment which is generally used for fibers, films and resins, such as titanium oxide or carbon black; organic colorant such as Phthalocyanine Blue, azo-based yellow or quinacridone; ultraviolet light absorber such as various benzophenone-based compounds, triazole compound or salicylate compound; and others such as a flame retardant and flame retarding aid.

Optical Fiber Loose Tube

The terminal carboxyl group concentration of polybutylene terephthalate (A') constituting the optical fiber loose tube of the present invention is 15 eq/ton or less. When the terminal carboxyl group concentration is higher than 15 eq/ton, tensile elongation is lowered by hydrolysis under a high-temperature and high-humidity environment, whereby the loose tube is easily broken by external stress.

The intrinsic viscosity of polybutylene terephthalate (A') constituting the optical fiber loose tube of the present invention is 1.0 to 1.2. When the intrinsic viscosity is lower than 1.0, the tube is easily cracked or broken by external force.

Production Process

As a process for producing a resin composition for optical fiber loose tubes may be used a process which is generally employed. For example, a process in which the above components are mixed together by a mixer such as a tumbler, V-shaped blender, Banbury mixer, kneading roll or extruder may be used.

The optical fiber loose tube can be produced from the above resin composition by a general tube forming machine.

In other words, the resin composition is extruded with a ring die and stretched into the form of a tube. The extrusion conditions include a resin temperature of preferably 250 to 270° C. When the resin temperature is lower than 250° C., the melt viscosity becomes high and extrusion molding becomes difficult and when the resin temperature is higher than 270° C., the deterioration of polybutylene terephthalate is promoted disadvantageously.

Since the crystallization of polybutylene terephthalate preferably proceeds from the viewpoints of mechanical properties and post-shrinkage, the tube cooling temperature is preferably 40 to 90° C., particularly preferably 50 to 70° C.

The resin composition for optical fiber loose tubes of the present invention can be extrusion molded into the form of an optical fiber loose tube. According to the present invention, the haul-off speed of the optical fiber loose tube can be set to 200 m/min or more.

The following examples are given to further illustrate the present invention. In the examples, characteristic properties were evaluated by the following methods. Polybutylene terephthalate may be abbreviated as PBT.

Quality Abnormality Caused by Scum:

Abnormality in the shape or color of a tube caused by scum is evaluated when 10 km of an optical fiber loose tube is produced by extrusion molding and observed with the eye.

○: no abnormality

X: there is quality abnormality caused by scum.

Tensile Elongation at Break After Hydrolysis Resistance Test:

The optical fiber loose tube is cut to a length of 10 cm and the inside of the tube is completely washed with n-hexane to prepare a test sample. A pressure cooker test is made on this test sample at 122° C. and 100% RH for 60 hours.

Thereafter, a core material having a diameter of 20 mm (wire) is inserted into the tube to a length of 15 mm from both ends to prevent the breakage from the tube that is holding by chucks which is caused by the deformation of the tube and the interval between the chucks is set to 70 mm (this portion is not reinforced with the core material) to carry out a tensile test at a pulling rate of 10 mm/min and calculate elongation from the following equation.

elongation (%)=(amount of displacement/interval between chucks)×100

Quality of Loose Tube:

The intrinsic viscosity and terminal carboxyl group concentration of the optical fiber loose tube obtained by molding are measured by the following methods.

Intrinsic Viscosity:

The intrinsic viscosity [η] of a polymer is calculated from a solution viscosity measured at 25° C. in orthochlorophenol.

Terminal Carboxyl Group Concentration:

The terminal carboxyl (COOH) group concentration is the number of equivalents per $10^6$ g of a polymer measured by the A. Conix method (Makromol. Chem. 26,226 (1958)).

Reference Example 1

98 wt % of polybutylene terephthalate (of Teijin Limited, intrinsic viscosity of 1.14, terminal carboxyl group concentration of 5 eq/ton) and 2 wt % of polyethylene wax (PE-520 of Hoechst AG dropping point (based on ASTM 556) of 117 to 122° C., density of 0.92 to 0.94 g/cm$^2$ (20° C.)) were blended together with a blender, the resulting blend was melt kneaded with a 44 mm-diameter twin-screw extruder at a cylinder temperature of 260° C., a screw revolution of 160 rpm and a supply rate of 50 kg/h, and thread discharged from a die was pelletized to obtain a master batch.

EXAMPLE 1

The master batch of Reference Example 1 was blended with polybutylene terephthalate (of Teijin Limited, intrinsic viscosity of 1.14, terminal carboxyl group concentration of 5 eq/ton) at a dilution of 100X, and the resulting blend was formed into an optical fiber loose tube (outer diameter of 3 mm, inner diameter of 2 mm) by a 40 mm-diameter extrusion molding machine for tubes at a cylinder temperature of 260° C., a dice temperature of 260° C., a cooling bath water temperature of 20° C. and a haul-off speed of 250 m/min. Subsequently, the formation of scum when a 10 km long optical fiber loose tube was extrusion molded was evaluated based on the following criteria. The hydrolysis resistance of the obtained optical fiber loose tube was evaluated after the optical fiber and gel-like intimate mixture contained in the loose tube were removed and the inside of the tube was washed with hexane. These results are shown in Table 1.

EXAMPLE 2

An optical fiber loose tube was extrusion molded and evaluated in the same manner as in Example 1 except that the master batch of Reference Example 1 was blended with polybutylene terephthalate (of Teijin Limited, intrinsic viscosity of 1.12, terminal carboxyl group concentration of 8 eq/ton) at a dilution of 30X.

COMPARATIVE EXAMPLES 1, 2 and 3

Optical fiber loose tubes were extrusion molded and evaluated in the same manner as in Example 1 except that the master batch of Reference Example 1 was not blended and polybutylene terephthalate having an intrinsic viscosity of 1.14 and a terminal carboxyl group concentration of 5 eq/ton of Teijin Limited (Comparative Example 1), polybuthylene terephthalate having an intrinsic viscosity of 1.12 and a terminal carboxyl group concentration of 26 eq/ton of Teijin Limited (Comparative Example 2) and polybutylene terephthalate having an intrinsic viscosity of 1.20 and a terminal carboxyl group concentration of 40 eq/ton of Teijin Limited (Comparative Example 3) were used, respectively.

COMPARATIVE EXAMPLE 4

An optical fiber loose tube was extrusion molded and evaluated in the same manner as in Example 1 except that the master batch of Reference Example 1 was added to polybutylene terephthalate used in Comparative Example 3 at a dilution of 30X and uniformly mixed by a V-shaped blender.

COMPARATIVE EXAMPLE 5

99.94 wt % of polybutylene terephthalate (of Teijin Limited, intrinsic viscosity of 1.12, terminal carboxyl group concentration of 26 eq/ton) and 0.01 wt % of polyethylene glycol (KRM-4004 of Sanyo Chemical Industries, Ltd.) were mixed together by a blender to coat the surface of the polybutylene terephthalate pellet with the polyethylene glycol, and 0.05 wt % of calcium stearate (of Wako Pure Chemical Industries, Ltd., guaranteed reagent) was added and further blended by a blender.

An optical fiber loose tube was extrusion molded from the resin composition obtained by the above process and evaluated in the same manner as in Example 1.

TABLE 1

| | | Ex. 1 | Ex. 2 | C. Ex. 1 | C. Ex. 2 | C. Ex. 3 | C. Ex. 4 | C. Ex. 5 |
|---|---|---|---|---|---|---|---|---|
| composition | amount of PBT (wt %) | 99.98 | 99.94 | 100 | 100 | 100 | 99.94 | 99.94 |
| | additive | PE-Wax* | PE-Wax* | — | — | — | PE-Wax* | StCa** |
| | amount (wt %) | 0.02 | 0.06 | 0 | 0 | 0 | 0.06 | 0.05 |
| quality abnormality caused by scum | | ○ | ○ | x | x | x | ○ | x |
| quality of loose tube (intrinsic viscosity) | | 1.12 | 1.11 | 1.12 | 1.09 | 1.08 | 1.08 | 1.07 |
| terminal COOH concentration (eq/ton) | | 9 | 10 | 8 | 28 | 41 | 42 | 29 |
| tensile elongation at break after hydrolysis resistance test | | 13 | 12 | 15 | 2.0 | 1.5 | 1.5 | 2.0 |

Ex.: Example
C. Ex.: Comparative Example
PE-Wax*: PE-520 of Hoechst AG
StCa**: calcium stearate, guaranteed reagent of Wako Junyaku Co., Ltd.

It is understood from the results of Table 1 that as shown in Examples. the resin composition for optical fiber loose tubes of the present invention has high hydrolysis resistance. is free from the formation of scum at a high haul-off speed and is very effective in greatly improving productivity.

According to the present invention, it is possible to provide a resin composition for optical fiber loose tubes which has excellent hydrolysis resistance and enables an optical fiber loose tube to be produced at a high yield without causing quality abnormality by the formation of scum even at a high haul-off speed.

What is claimed is:

1. A process for producing an optical fiber loose tube which comprises (A') 100 parts by weight of polybutylene terephthalate having a terminal carboxyl group concentration of 15 eq/ton or less and an intrinsic viscosity of 1.0 to 1.2, and (B) 0.005 to 0.1 part by weight of polyethylene wax, which process comprising the step of extrusion molding at a haul-off speed of 200 m/min or more a resin composition for optical fiber loose tubes, said resin composition comprising (A) 100 parts by weight of polybutylene terephthalate having a terminal carboxyl group concentration of 10 eq/ton or less and an intrinsic viscosity of 1.0 to 1.2, and (B) 0.005 to 0.1 part by weight of polyethylene wax.

2. The process of claim 1, wherein extrusion molding is carried out at a resin temperature of 250 to 270° C.

3. The process of claim 1 or 2, wherein after extrusion molding, the obtained tube is cooled at 40 to 90° C.

4. The method of claim 1, wherein the polyethylene wax is a polyethylene homopolymer.

* * * * *